May 7, 1963 T. OSWALD 3,089,004

REPEATERS FOR MULTI-CHANNEL TELEPHONE SYSTEMS

Filed Nov. 27, 1959 2 Sheets-Sheet 1

Inventor:
Thomas Oswald
BY
Baldwin & Wight
Attorneys

May 7, 1963 T. OSWALD 3,089,004

REPEATERS FOR MULTI-CHANNEL TELEPHONE SYSTEMS

Filed Nov. 27, 1959 2 Sheets-Sheet 2

INVENTOR:
THOMAS OSWALD

United States Patent Office 3,089,004

Patented May 7, 1963

3,089,004

REPEATERS FOR MULTI-CHANNEL TELEPHONE SYSTEMS

Thomas Oswald, Hartley, near Dartford, England, assignor to Submarine Cables, Limited, London, England, a corporation of England Filed Nov. 27, 1959, Ser. No. 855,795

8 Claims. (Cl. 179—170)

The invention relates to improvements in repeaters for carrier telephone systems and is particularly concerned with the problem of the suppression of possible signal frequency feed back paths between the repeater input and output.

The invention is described with reference to the accompanying drawings, in which.

Invariably the power supply for the repeater in a carrier telephone system is direct current applied to the centre conductor of the cable. It is usual to bridge a power separation filter across the cable terminals and derive the amplifier high voltage across a series resistor—often mainly produced by the valve heater resistance—inserted in the middle of the filter. This introduces two feedback paths, namely:

(1) Directly between cable terminals, and (2) The A.C. component of the anode current of the output valves develops a voltage across the by-pass condenser of the high voltage dropping resistor which can reach the input of the repeater via one half of the power separation filter.

Because the low-potential side of the amplifier cannot simultaneously be at sea-earth voltage and at line-supply voltage it is necessary to introduce at least two blocking condensers.

Figure 1:
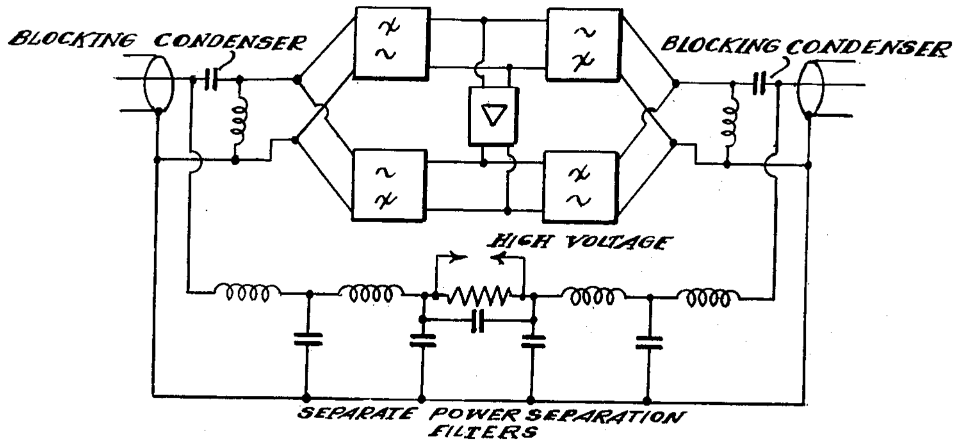
Fig. 1. PRIOR ART
FIGURE 1 is a schematic circuit diagram of one prior art repeater arrangement for carrier telephone systems.

It has already been proposed that these blocking condensers should be placed:

(*a*) In series with the cable inner conductor, as shown in FIGURE 1, in which case the input and output transformers of the amplifier must also withstand the line-supply voltage or additional capacitors must be introduced for this purpose.

Figure 2:
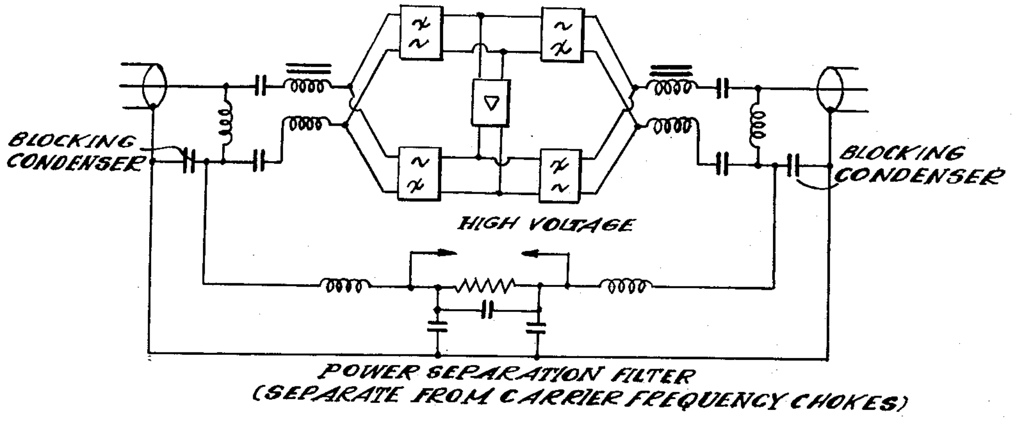
Fig. 2. PRIOR ART
FIGURE 2 is a schematic circuit diagram of another prior are repeater arrangement for carrier telephone systems.

While this circuit is not uneconomical in the total number of components, the number of components required to withstand the line voltage is greater than in:

(*b*) Where the blocking condensers are placed in series with the outer conductor (sea-earth), as shown in FIGURE 2. In this case, there is no very great voltage across the amplifier transformers but a feedback path is introduced by virtue of the finite impedance of the blocking condensers.

It is necessary to insert at least two longitudinal stop coils which may be co-axial chokes in series with the repeater proper if the blocking condensers are not to have an impracticably high value.

It will be seen that in each of the prior art circuits of FIGURES 1 and 2 several components, in addition to the blocking condensers, must withstand the line supply voltage.

It is an object of the present invention to provide a circuit offering a more economical and advantageous method of suppressing unwanted longitudinal currents and of by-passing the D.C. across the repeater.

According to the present invention and as will be described with reference to FIGURE 3, a two-directional repeater for a carrier telephone system utilizes different frequency bands for transmitting signals in opposite directions through the repeater so that the different frequency bands traverse the common amplifier of the repeater in the same direction by means of associated two-directional filters. This invention is characterised by the provision of a circuit including a first coil, a longitudinal coil having two windings and a capacitor, the capacitor being connected between the outer conductor of the cable and one winding of the longitudinal coil, the other end of the longitudinal coil winding being connected to the low signal potential terminal of the directional filters. The other winding of the longitudinal coil is connected directly between the inner conductor of the cable and the high signal potential terminal of the directional filters, and the first coil is connected between the terminals of the directional filters.

Preferably the common amplifier of the repeater is coupled to the input filter for each direction of transmission by means of a transformer or a coaxial choke.

The high voltage dropping resistors which, in the application of this invention to repeaters employing thermionic valves, may consist wholly or partly of the valve heaters, is placed in series with the low signal potential lead connecting the terminal filters at the output of the amplifier.

Figure 3:
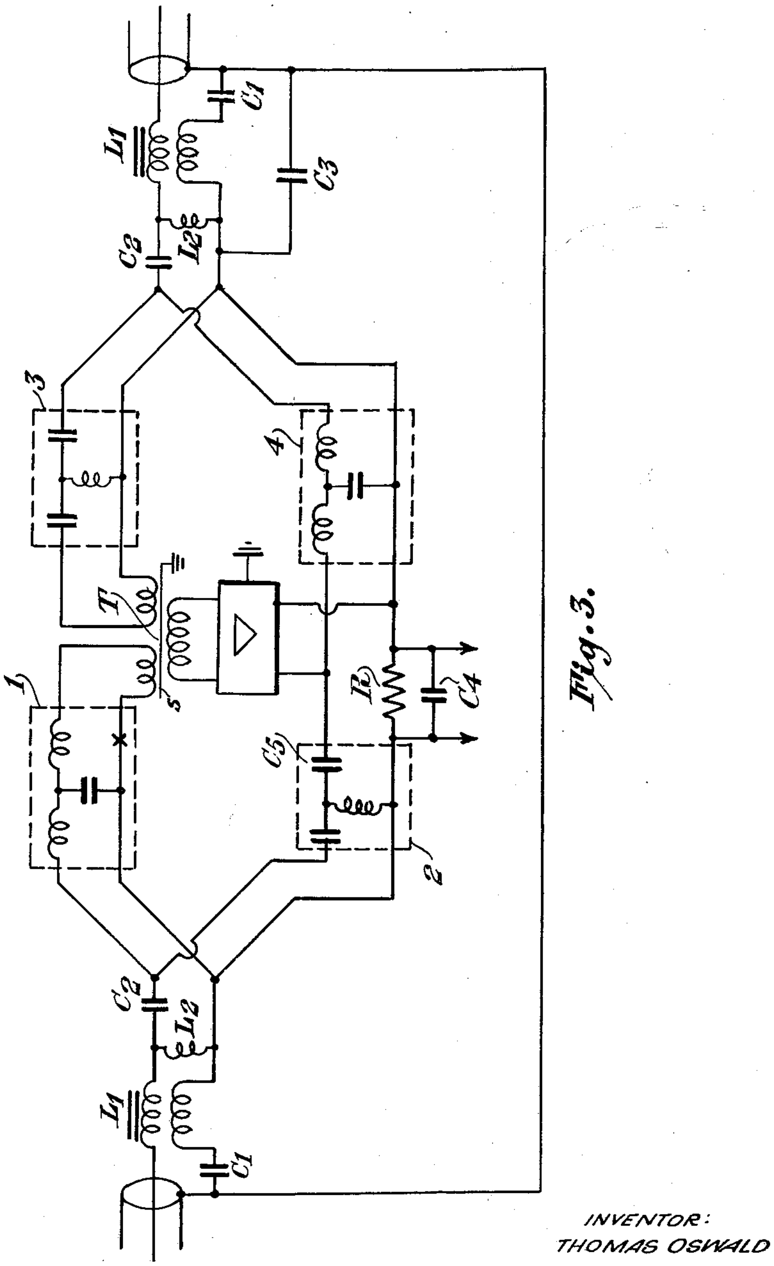
FIGURE 3 is a schematic circuit diagram of a repeater arrangement for carrier telephone systems according to the present invention.

Referring to FIGURE 3, the blocking condensers $C_1$ and $C_3$ are the only components required to withstand the line supply voltage. $C_1$ forms a high pass filter with the coil $L_2$ and the condenser $C_2$. The use of a filter section ensures that $C_1$ is as small as possible and in the circuit shown a full section is used as it halves the value of $L_2$ with respect to a half section. In the same manner as in the circuit of FIGURE 2 the finite impedances of the blocking condensers $C_1$ cause voltages to appear in the signal circuit. The resultant feedback path between the output and the input of the repeater is attenuated by the low-pass filter formed by the condensers $C_1$ and $C_3$ and the longitudinal, or serially connected chokes $L_1$ where $C_3$ need not be a component but may represent the capacity to sea-earth of the apparatus.

Power reaches the amplifier by one winding of the coils $L_1$ and by the coils $L_2$, continuing to the dropping resistor (which in the case of repeaters employing thermionic valves consists mainly of the valve heaters) by means of the low potential wires of one or other of the directional filters 2 and 4, i.e., no separate power separation filter (as, for example, is used in FIGURES 1 and 2) is necessary.

There is an additional feedback path because the low potential wires of the directional filters 1 and 2 are not at amplifier chassis potential by virtue of the voltage drop at signal frequency (high frequency band) across $C_4$. This path is attentuated by the screened transformer T, which has an electrostatic screen S between primary and secondary windings. $C_4$ is of large enough value to make the design of T not difficult (note that the parallel combination of $C_4$ and R degrades the Q and alters the value of the input condenser $C_5$ of the associated high-pass filter with which it is in series. $C_5$ must operate safely with direct voltage loading).

In the repeater shown in FIGURE 3, the transformer T has its two input windings wound in opposition so that signals traversing the two paths from amplifier output to input via the directional filters, but not sufficiently attenuated by them, tend to cancel in the transformer output winding—i.e., the stopband attenuation requirements of the directional filters are reduced. The transformer is not a special requirement of the circuit—it could, for example, be replaced by a coaxial choke. The longitudinal coils $L_1$ must carry the line current so that their design is more difficult than that of the corresponding coils in, say FIGURE 2. To satisfy the requirements of low direct current resistance, low loss in the transverse, or shunt circuit and high longitudinal impedance, it has been found that a bifilar design of choke can be more effective than a coaxial design—despite the inherent disadvantage of the bifilar choke with respect to a coaxial choke that the coupling between the transverse and longitudinal circuits is not negligible.

What is claimed is:

1. A two-directional repeater for a carrier telephone system inserted in a cable having an inner and an outer conductor, in which system different frequency bands are utilized for transmitting signals in opposite directions through the repeater and in which signals from both directions are caused to traverse a single amplifier of the repeater in the same direction comprising at least two pairs of frequency selective filters, a circuit coupled to each side of the repeater and including a signal frequency choke, a second choke having two windings, and a condenser connected between the outer conductor of said cable and one end of a first winding of the second choke, the other end of said first winding being connected to the one terminal of one of the filters, a second condenser, the other winding of said second choke being connected between said inner conductor and one end of said second condenser, the other end of said second condenser being connected to another terminal of said one filter, said signal frequency choke being connected between the terminals of said second choke on the side connected to said frequency selective filters, and a direct current high voltage power source connected between said signal frequency chokes.

2. A system according to claim 1 further comprising a bridging capacitance connected in parallel with said second condenser and said other winding of said second choke.

3. A system according to claim 1 wherein said power source includes a voltage dropping resistor connected between two of said frequency selective filters and a condenser connected across said resistor, said resistor defining a direct current path through said system, said system further comprising means connecting said resistor to said amplifier to supply high voltage direct current energy thereto in response to the flow of direct current through said system.

4. A system according to claim 1 in which said amplifier includes at least one thermionic valve having an indirectly heated cathode and a heater winding wherein said resistor is formed by said heater winding.

5. A system according to claim 1 wherein said second choke is bifilar wound.

6. A system according to claim 1 wherein two of said frequency selective filters are coupled to said amplifier through separate primary windings of a transformer, the secondary of which is coupled to said amplifier and wherein the sense of the connections of these primaries is such that any feedback through either of said two filters from the output of said amplifier will be in phase opposition to any feedback through the other one of said two filters thereby reducing the possibility of oscillation in said system.

7. A system according to claim 6 wherein said transformer is provided with an electrostatic screen between said primary and said secondary windings.

8. A system according to claim 1 wherein two of said frequency selective filters are connected to the input of said amplifier by inductance means.

References Cited in the file of this patent

UNITED STATES PATENTS

| | | |
|---|---|---|
| 1,866,261 | Lutomirski | July 5, 1932 |
| 2,115,138 | Darlingon | Apr. 19, 1938 |
| 2,470,307 | Guanella | May 17, 1949 |

FOREIGN PATENTS

| | | |
|---|---|---|
| 148,843 | Sweden | Aug. 4, 1953 |
| 1,091,007 | France | Oct. 27, 1954 |